June 10, 1947.  J. MERCIER  2,422,117
UNITARY CONTROL FOR PLURAL ELECTRIC MOTORS
Filed June 5, 1944   3 Sheets-Sheet 1
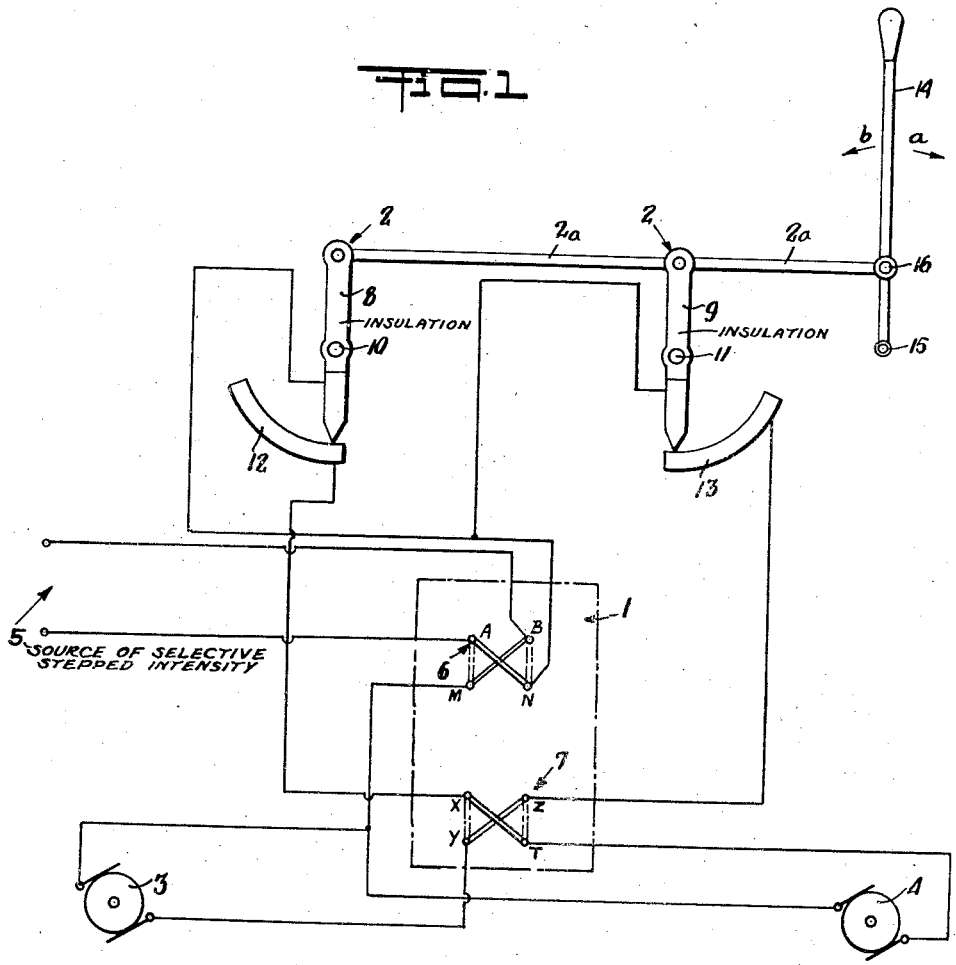
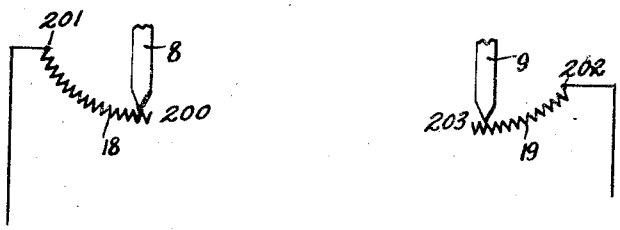
INVENTOR.
Jean Mercier
BY Mock & Blum
ATTORNEYS

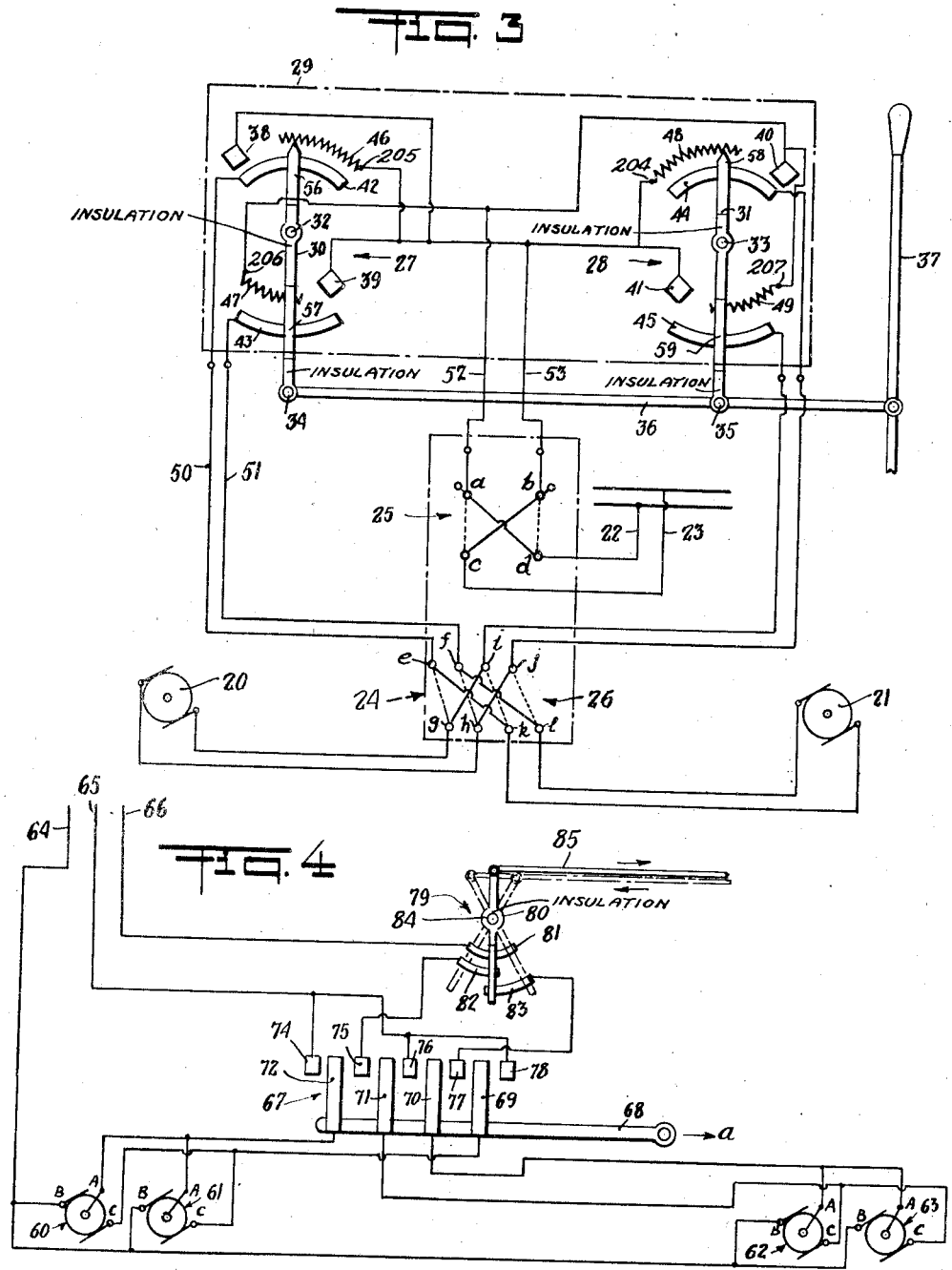

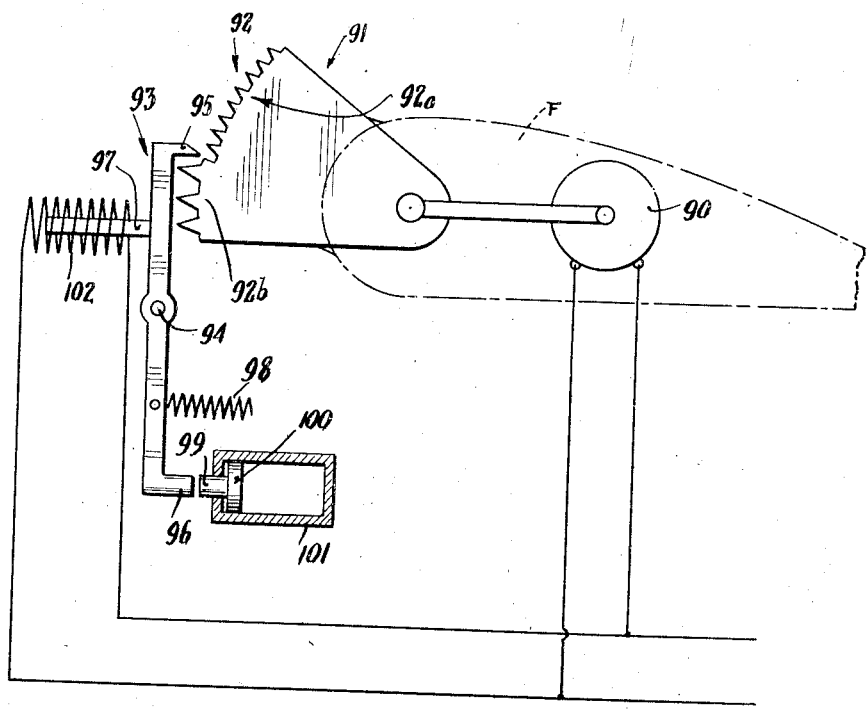

Patented June 10, 1947

2,422,117

UNITED STATES PATENT OFFICE 2,422,117

UNITARY CONTROL FOR PLURAL ELECTRIC MOTORS

Jean Mercier, New York, N. Y.

Application June 5, 1944, Serial No. 538,805

4 Claims. (Cl. 172—239)

The present invention pertains to a mechanism for the automatic control of two or more electromotors on a machine, each actuating one of two or more devices which are intended to be simultaneously and correspondingly operated, this operation alternating in opposite directions. Such devices may be wing flaps, landing struts or the like on aircraft, brakes on a vehicle, or, for instance, appliances actuating a press head in a stationary unit. The present invention is applicable to any case in which at least two auxiliary devices are provided on a machine in such manner, that their failure to operate concomitantly will cause a disturbance in the operation of the machine, which can be corrected or rectified by the operator of said machine by means of a displacement of the general controls of the same.

It is the principal object of the present invention to provide a control mechanism, including a distributing unit operatively connected to the general controls of the machine and being adapted to distribute electric energy to the individual motors in accordance with the position of said general controls, so that, when the latter are displaced by the operator—to correct a disturbance in the operation of the machine, or in order to alter the direction of travel or any other condition of the same—then, said electromotors will be automatically and differentially actuated so as to cause said devices to assist in achieving the desired position and condition of the machine.

To that end, the control mechanism, according to the present invention, includes a master unit which controls the flow of actuating energy to and from all electromotors. The mechanism further includes a distributor unit which is operatively connected to the general controls of the machine and controls the distribution of current to each individual electromotor.

According to one feature of the present invention, the master unit includes a reversing switch affording three positions. In one position, current will be supplied to said electromotors to cause the same to operate said devices in one direction, while in another position current will be supplied to said motors so as to cause the same to operate said devices in the opposite direction, and, in a third position, all motors will be shut off.

According to another feature of the present invention, the distributor unit includes symmetrically arranged switches and, preferably, electric resistances. The said switches are operatively connected to the general controls of the machine to which the control system is applied.

The distributor unit may be alternatively arranged to respond to one of the following purposes:

When the general controls are progressively displaced, (1) One of the motors is cut off, while the other continues to be supplied;

(2) One of the motors is first supplied with less current and then cut off, while the other is supplied with additional current until said general controls are in an extreme position;

(3) One of the motors is first cut off and then supplied with current whose poles are changed so as to cause rotation of said one motor in the opposite direction, while the other motor is supplied with additional current in the original direction.

A combination of the foregoing features is always possible.

According to a further feature of the present invention, a locking mechanism may be associated with said electromotors and said devices. This locking mechanism will prevent any movement of said devices when no current is supplied to the control system and will afford complete freedom of movement of the same when current of full intensity is supplied. In addition, if the source of energy is equipped to supply current of stepped varying intensity, then, the locking mechanism will lock and unlock said devices progressively in accordance with the variations of current intensity.

The invention will now be explained as applied, by way of example, to the control of the wing flaps of an airplane. To that end, several embodiments of the control system according to the present invention will be described which are illustrated in the accompanying drawings, and in which Fig. 1 is a schematic section of a control system according to the present invention;

Fig. 2 is a schematic view of a modified detail of the system shown in Fig. 1;

Fig. 3 is a schematic section of a modified control system;

Fig. 4 is a schematic section of a switch arrangement for use of three phase alternating current; and Fig. 5 is a sectional view of the locking mechanism according to the present invention.

In Fig. 1 there is provided a master unit 1, a distributor unit 2, and two electromotors 3 and 4 intended to control the position of two wing flaps in an airplane (not shown).

Master unit 1 is connected to a source of current 5 and includes two reversing switches 6 and 7.

Distributor unit 2 includes two contact rods or sliders 8 and 9 pivoted respectively at 10 and 11, and respectively cooperating with two curved contact plates 12 and 13. 14 designates the steering rod of the plane on which the system is installed. Rod 14 is pivoted at 15 and, is pivotally connected to link 2a at 16. Said link 2a is pivoted to rods 8 and 9.

When the flaps are not operated, switches 6 and 7 are open.

When the flaps are to be lowered, the pilot may actuate switches 6 and 7 to establish the connections shown in broken lines. These connections are A to M, B to N, X to Y and Z to T. As long as unit 2 remains in the neutral position (as shown), there will be an even distribution of current to both motors 3 and 4.

Assuming now a disturbance occurs in the operation of the flaps caused, for instance, by an undue resistance slowing down the movement of the flap actuated by motor 3. As a result, the flap associated with motor 4 will drop faster and the plane will assume an inclined position. To correct this disturbance, the pilot will displace rod 14 to the right (arrow a) to restore the plane to a balanced condition by action on the ailerons.

This displacement of rod 14 will cause a corresponding movement of rods 8 and 9, whereby rod 9 will be carried beyond the lower end of plate 13. This will cut off motor 4, while motor 3 continues to be supplied.

Thus by virtue of the arrangement of unit 2 and its operative connection to the general controls of the plane, the normal reaction of the pilot to a disturbance will, automatically, cause a differential operation of the flaps which will assist in achieving the desired condition and position of the plane.

When the flaps are to be raised, the pilot may actuate switches 6 and 7 to establish the connections shown in full lines. These connections are A to N, B to M, T to X and Y to Z. This will again, cause equal flow of current to both motors 3 and 4 but in the opposite direction in the case of direct current.

Assuming that the flap associated with motor 3 is slow in rising, then the plane will become inclined, but in the opposite direction. The pilot will attempt to correct the disturbance by actuating rod 14 in the direction of arrow b and this will stop motor 4—whose associated flap was fast in rising, and keep motor 3 energized.

The broken line positions of switches 6 and 7 represent the lowering operation and the full line positions the raising operation. It is however essential that each position be assigned to one of the alternating operations of the flaps and that both switches be reversed when a reversion of the flap movement is desired.

In Fig. 2, the contact plates 12 and 13 of Fig. 1 are replaced by rheostats 18 and 19, in which the resistance per unit of length decreases from one end to the other. The point of maximum resistance of rheostat 18 is its inner end 200, and the point of maximum resistance of rheostat 19 is its inner end 203. Both rheostats 18 and 19 decrease in resistance from their respective points 200 and 203 to their respective points 201 and 202.

When unit 2 is in the neutral position (Fig. 1), rods 8 and 9 engage rheostats 18 and 19 at the points 200 and 203 of maximum resistance.

By following the examples of the operation of the control system, as described in connection with Fig. 1, it will be seen that, when rod 14 is displaced, with the arrangement according to Fig. 2, while the motor whose flap is fast is stopped, the resistance included in the circuit of the other motor is reduced; accordingly an increased force will act on the slow flap tending to quicker bring the same into alignment with the other flap.

Fig. 3 shows the most desirable arrangement for bringing the flaps, in case of disturbance, back into alignment with each other in the quickest possible time. This is achieved by not only supplying current of higher intensity to the motor whose flap is slow (as in Fig. 1) but, in addition, by supplying the other motor with current in the opposite direction, so that the advanced flap is not only stopped but positively reversed.

With the control system according to Fig. 3, the two wing flaps are associated with electric motors 20 and 21. Direct current is supplied by a suitable source through cables 22 and 23. The master control unit is contained in a switch box 24, and includes a simple reversing switch 25 and a double reversing switch 26. The contact bars of switches 25 and 26 are jointly controlled by one actuating lever (not shown) which extends outside of box 24 so that, by one operation of said lever, all connections may be broken or established either as shown in broken or in full lines.

The distributor control unit consists of two symmetric systems 27 and 28, comprising electric resistances and contact shoes rigidly mounted in a casing 29, and two contact levers 30 and 31 rotatably mounted in the same at 32 and 33.

Levers 30 and 31 project from casing 29 and their projecting ends 34 and 35 are connected together by a rod 36 to the steering rod 37 of the plane, so that said levers 30 and 31 turn in accordance with the displacements of rod 37.

Distributor systems 27 and 28 each include, two relatively short contact shoes 38 and 39, and 40 and 41, respectively; two curved elongated contact shoes 42 and 43, and 44 and 45, respectively; and two curved resistances 46 and 47, and 48 and 49 respectively. These resistances and shoes are connected by cables 50, 51, 52, 53, 54, and 55 to switches 25 and 26, in the manner shown in Fig. 3 of the drawing. The value of each of resistances 46, 47, 48 and 49 increases progressively from respective points 205, 206, 204 and 207.

Levers 30 and 31 are made of a non-conducting material and each carry two contact brushes 56 and 57, and 58 and 59, respectively, which will establish electrical connection between one of the contact shoes and the adjacent resistance when said brushes are in contact with the same.

When all switches are in the open position, the motors are not energized and the flaps are not actuated. In the position shown in broken lines, the current will be equally distributed to motors 20 and 21, and the flaps will be raised. The connections in this case are a to c, b to d, e to g, f to h, i to k, and j to l. The same applies in the case illustrated in full lines, but, the poles being reversed by switch 25, the motors will rotate in the opposite direction and the flaps will be lowered. The connections shown in full lines in this case are c to b, d to a, e to k, i to g, f to l, and j to h.

In addition, in the position shown in broken lines, distributor system 27 controls motor 20 and system 28 motor 21, but, when the switches are turned into the position shown in full lines, then, system 27 is shifted on to motor 21 and system 28 to motor 20.

When the distributor systems 27 and 28 are in their neutral position (as shown), current passes in each system through both resistances and the latter being of equal value, the current is evenly distributed. But, when rod 37 is displaced—for the reasons and in the manner heretofore explained—levers 30 and 31 will be turned whereby, in one of the systems, the lever will be placed in a zero position in which the brushes are not in contact, while, in the other system the brushes will establish contact between the shoes and points of the resistances where the value thereof is lower than in the neutral position. Accordingly, one of the motors will be stopped while the other is accelerated. Further displacement of rod 37 will carry levers 30 and 31 into an extreme position in which, in one system, both resistances are eliminated and direct contact is established between the long and the short shoes, while, in the other system, the value of the resistances is reduced to a minimum. This will reverse the poles for the motor controlled by said one system, and will reverse the direction in which said motor is rotated so that the associated flap is also reversed, while, in the other system, the highest possible intensity of current is supplied to the motor associated therewith, so that the operation of the flap associated with the latter motor is accelerated in the original direction.

By following the examples as in the case of the control system according to Figs. 1 and 2, it is obvious that in the raising as well as in the lowering operation, if one of the flaps is fast in rising or lowering, the motor associated with said flap will be stopped and eventually reversed while the other will be accelerated.

It is immaterial whether the broken line position is coordinated to the raising or lowering operation, but the full line position must always correspond to the opposite operation.

Fig. 4 shows an arrangement for three phase alternating current in connection with an airplane having two flaps on either side. Each of these flaps is actuated by one of the electromotors 60 to 63. Cables 64, 65 and 66 are connected to a suitable source of curent. A connection through the body of the airplane may of course be substituted for cable 64. Cables 65 and 66 are connected to master switch 67, which includes a slidably mounted contact bar 68 of non-conducting material carrying four contact brushes 69 to 72, which are adapted to cooperate with five contact shoes 74 to 78. As shown, cable 66 is connected to the distributor unit 79, cable 65 to shoes 74, 76 and 78, shoes 75 and 77 are connected to the distributor unit 79, brush 69 is connected to one phase winding of motors 60 and 61, and brush 71 to the same phase winding of motors 62 and 63, and brushes 70 and 72 are connected to a second phase winding of the motors.

Distributor 79 comprises a contact lever 80 and three contact shoes 81, 82 and 83. The portion of lever 80 adjacent shoes 81 to 83 should be a good conductor, adapted to engage and to establish contact between said shoes. The remainder of said lever 80 is non-conducting or insulated. Lever 80 is pivoted at 84, and portion 85 thereof is connected to the steering rod of the airplane (not shown), so that displacement of said rod will cause lever 80 to turn in one or the other direction.

As shown, the inner ends of shoes 82 and 83 are located above each other so that lever 80 will, in its neutral position (as shown in full lines), connect all three shoes, but will, when displaced—in consequence of a movement of the said steering rod—connect shoe 81 with only one of the two other shoes (positions shown in broken lines).

When the flaps are to be actuated, the operator will displace bar 68 to the right (arrow $a$), and this may correspond to the raising or lowering of the flaps. However, displacements of bar 68 in opposite directions should always correspond to operations of the flaps in opposite directions.

Phase winding B of motors 60 to 63 is always connected to cable 64.

When bar 68 is displaced in the direction of arrow $a$, phase winding A of the motors will be energized by cable 65, and phase winding B by cable 66. A displacement of bar 68 in the opposite direction will reverse this relationship and, accordingly, the direction of rotation of the motors.

With this arrangement and structure, and some means being provided for to cause the motors to stop when a phase is cut, and when the steering rod is displaced so that lever 80 is removed from contact with shoe 82 or 83, then one group or pair of motors is stopped while the other continues to work.

Fig. 5 shows a locking mechanism which may be used to advantage in the operation of the control system of the present invention.

If this locking mechanism is employed, then a member 91 is interposed between each flap and its associated electromotor 20 in Fig. 3. In addition, conventional means should be provided to supply the system with current of stepped varying intensity.

Cam member 91 has a serrated face 92 and said cam member 91 is connected to the flap F as shown in Fig. 5.

A lever 93 pivoted at 94 carries a locking finger 95 adapted to engage face 92 of cam member 91. Lever 93 carries two projections 96 and 97.

There is provided a spring 98 which urges lever 93 to turn so that finger 95 engages face 92. As lever 93 moves away from cam member 91, projection 96 engages a rod 99 of a piston 100 which is slidable in a cylinder 101. Suitable sealing means are inserted between piston 100 and cylinder 101.

Projection 97 extends into an electro-magnet 102, which when energized, attracts said projection. Magnet 102 is connected to the same source of current as motor 90.

Face portions 92a and 92b which comprise face 92, carry teeth of different length, those of face 92b projecting further towards finger 96 than those of face 92a.

When current is supplied to motor 90 and magnet 102 at a moderate rate, the action of magnet 102 will turn lever 93 so that cam member 91 will be unlocked for a movement corresponding to the arc formed by portion 92a. In order to disengage portion 92b, lever 93 must turn against the force of spring 98 and compress the fluid in cylinder 101. Magnet 102 is, preferably, adapted to cause such full turn of lever 93 only when motor 90 is under full load.

Cam member 91 being connected to flap F, said flap will move in unison with said cam member.

While cam member 91 has been described with two different projecting portions the number thereof may, of course, be increased, and they may project over a progressively increasing distance toward the stop member so that the progressive withdrawal of the locking finger will cause a more gradual unlocking before the cam attains full freedom of movement.

A locking mechanism as described above can be used to advantage whenever current of differential intensity is used to displace parts of a machine into a predetermined position. It is an important advantage of this mechanism that the same cables will carry the current for the electromotor as well as that for the locking mechanism. This affords an economy of weight which, in case of aircraft may be of paramount importance.

Thus, for instance, when the plane is being prepared for flight, the control system may be supplied with current of half the usual intensity to lower the flaps. Assuming that the yielding means (spring 98 and piston 100 in cylinder 101) have been correctly adjusted and the cam faces correctly dimensioned, then, the locking mechanism will stop the descent of the flaps when they are half way down, i. e., in the correct position for the take-off. In this manner, no surveillance or check-up of the flap movement is necessary during the preparation of the plane. The operator merely has to turn on the current and no further attention is required. Regardless of the time when he returns to shut the current off, the flaps will not exceed the desired position. On planes having a plurality of flaps, this is an important advantage.

By increasing the number of projecting portions of the cam member, it becomes possible to determine in advance the position into which the flaps will be lowered when the control system is supplied with current of stepped varying intensity. In this manner, the locking mechanism may be used to insure, automatically, an appropriate lowering of the flaps into take-off, landing and even dive-bombing position.

While the operation of the locking mechanism has been explained above in connection with the lowering of wing flaps, the relationship between the cam and the flaps may, of course, be reversed so that the various locking positions are reached during the raising operation.

It is obvious that the number of flaps (or other devices on a machine governed by a control system according to the present invention) on each side may be increased to more than two without departing from the spirit of the invention.

I claim:

1. In a control mechanism of the character described, the combination of two electromotors each controlling one of two devices of a machine, said devices being intended to be alternatingly actuated in two opposite directions, and required to be simultaneously and correspondingly actuated and capable, when operated in a different manner, of producing a disturbance in the working of said machine; general control means independent of said devices and adapted to be displaced by the operator of said machine for the correction of and in proportion to disturbances in the operation of said machine, a master switch adapted in one position to supply current to both said electromotors to operate said devices in one direction, and in a second position to supply current to both said electromotors to operate said devices in the opposite direction, and adapted, in a third position, to cut off both said electromotors, a distributor unit associated with said electromotors and said master switch, said distributor unit including movable contacts, said contacts being operatively connected to said general control means, said distributor unit being adapted to control the supply of current to each individual electromotor, said unit being further adapted, when said general control means are in their normal position, to supply equal current to each electromotor, and to supply, when said general control means are displaced from their normal position, continued flow of current to one of said electromotors while cutting off said other electromotor.

2. A mechanism according to claim 1, in which said distributor unit further includes electric resistances and is adapted, when said general control means are displaced from their normal position, to supply one electromotor with current of increased intensity and the other with current of decreased intensity.

3. A mechanism according to claim 1, in which said distributor unit is further adapted, when said general control means are displaced from their normal position and current continues to flow to said one electromotor, to supply said other electromotor with current suitable to rotate the same in the opposite direction.

4. In a mechanism according to claim 1, means to supply said master switch with current of stepped intensity, electrically actuated locking means associated with said devices and said electromotors, said locking means being adapted to prevent movement of said devices when said electromotors are not energized, to afford complete freedom of movement of the same when said electromotors are supplied with current of maximum intensity, and being further adapted alternatingly to reduce and increase said freedom of movement of said devices in accordance with stepped variations of the current intensity.

JEAN MERCIER.